Figure 2:
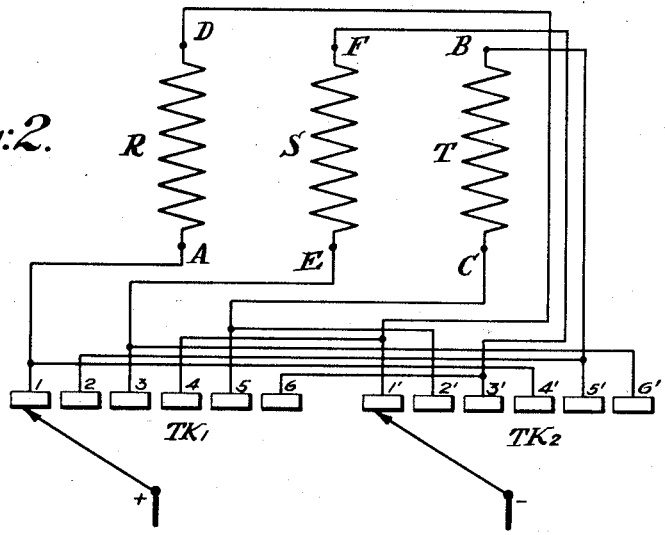

July 11, 1944.  C. ZELLWEGER  2,353,427
APPARATUS FOR CONVERTING MULTIPHASE ALTERNATING
CURRENT INTO DIRECT CURRENT AND VICE VERSA
Filed May 8, 1942  2 Sheets-Sheet 1
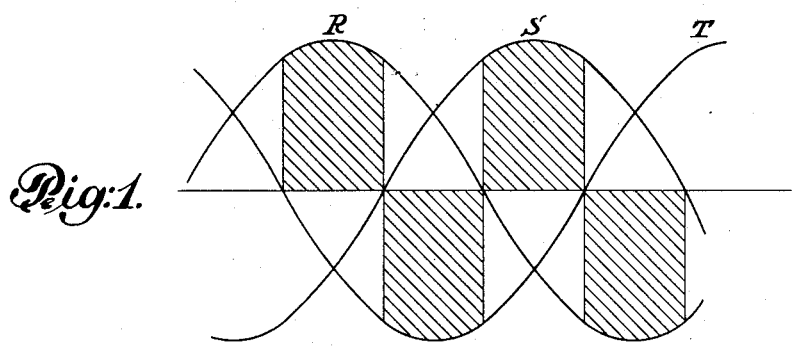
Fig:1.
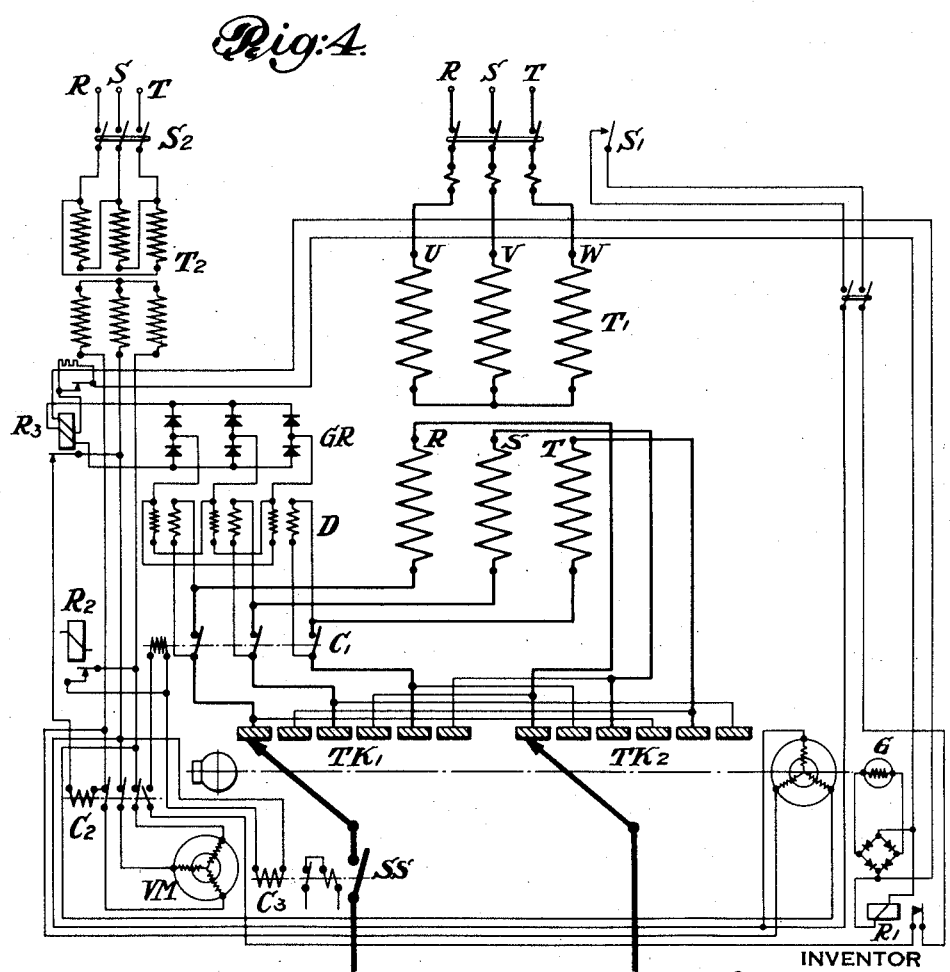
Fig:4.
INVENTOR
CARL ZELLWEGER
BY
ATTORNEY

INVENTOR
CARL ZELLWEGER
BY
ATTORNEY

Patented July 11, 1944

2,353,427

UNITED STATES PATENT OFFICE 2,353,427

APPARATUS FOR CONVERTING MULTI-PHASE ALTERNATING CURRENT INTO DIRECT CURRENT, AND VICE VERSA

Carl Zellweger, Zurich, Switzerland, assignor to International Standard Electric Corporation, New York, N. Y., a corporation of Delaware Application May 8, 1942, Serial No. 442,272
In Switzerland May 17, 1941

5 Claims. (Cl. 175—364)

The invention relates to a method for converting an alternating current into direct current or a direct current into alternating current by contacting converters and switching device for carrying out said method.

When converting alternating current into direct current by contacting converters the sparkless opening and closing of the contacts or the change-over from one contact segment to another presents a very difficult problem and the practical application of such converters depends in the first line from its perfect solution for even the slightest fire at the contact surfaces will lead within short to the complete uselessness of the contacting converter. This is true both for contacting converters using wiping contacts and for contacting converters provided with pressure contacts.

In the known contacting converters the change-over from one contact segment to the following one takes place during the periods in which the current passes through the zero point and various means have been proposed to improve the conditions for commutation, for instance so-called switching chokes, particularly in order to flatten a portion of the current curve adjacent to the said zero point. A time interval is obtained thereby during which the current has a very small value and during which commutation may be effected. By suitably selecting the said means the current may be lowered to such a value that sparking is prevented.

The present invention has for its object to provide means for securing the sparkless opening and closing of the contacts of contacting converters which are considerably cheaper and less heavy than for instance switching chokes. It is based on the known fact that the sum of the instantaneous values of the voltages of the phases of a tri-phase system is always zero.

The method according to the present invention is characterized in this, that the change-over from one phase to the following phase is effected in that moment in which the two phase voltages are equal but opposed.

The switching device for carrying out said method is characterised by two separate synchronously driven contacting apparatus, the contact segments of which are so connected with one another and with the terminals of the openly connected secondary windings of the transformer that the movable contact members of the two contacting apparatus are always changing-over from contact segments of one phase to contact segments of the following phase in that moment in which the two phase voltages are equal but opposed.

During commutation according to the present method there is no voltage difference between those contact segments between which the changing-over from one transformer phase to the other occurs, thus securing a commutation in which there is practically no short circuit.

The method has the advantage that perfect commutation is obtained without switching chokes.

The invention will be explained more fully in connection with the accompanying drawings in which Fig. 1 shows the voltage diagram of a tri-phase current, Fig. 2 the diagram of a switching device according to the present invention working as a rectifier, Fig. 3 the diagram of a switching device according to the present invention working as a D. C.-A. C. converter and Fig. 4 the complete circuit diagram of the switching device according to the present invention.

According to the method of the invention the changing-over from a considered phase, for instance R, to the next following phase, i. e., phase T must be effected in that moment, in which the voltage of the phase preceding the considered phase, in that case S, passes through zero.

Figure 3:
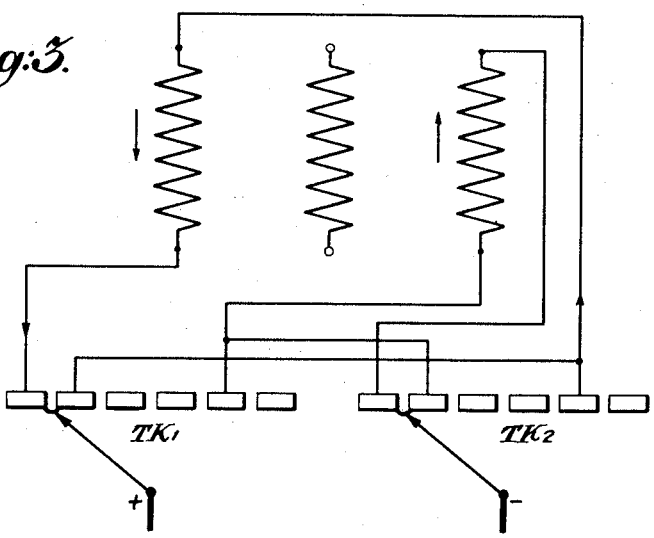

In order to obtain this in the arrangement as per Fig. 2, point A of phase R is connected with segment 1 of the first contacting apparatus TK1 and segment 4' of the second contacting apparatus TK2, point B of phase T with segment 2 of TK1 and segment 5' of TK2, point C of phase T with segment 5 of TK1 and segment 2' of TK2, point D of phase R with segment 4 of TK1 and segment 1' of TK2, point E of phase S with segment 3 of TK1 and segment 6' of TK2, and finally point F of phase S with segment 6 of TK1 and segment 3' of TK2.

If now the synchronously driven contact members move from segment 1 or 1' resp. to segment 2 or 2' resp. at the moment the voltage of the preceding phase passes through zero, then the secondaries of the phases R and T are short-circuited or connected in parallel resp.

In this moment the voltages in the said windings are of equal value but opposed and consequently the sum of their instantaneous values is equal to zero. Moreover the secondary of the third phase, that is S, is completely disconnected. The transformer operates in this moment just as a single phase transformer having two parallel secondaries, so that there is no actual short circuit of the two current carrying phases. The passage of the current from phase R (positive half-wave, Fig. 1) to the phase T (negative half-wave) takes thus place without any short-circuit current, so that a sparkless commutation is secured. The transformer phases carry current twice during each period and there is no start point and rectification occurs in a six-phase manner.

The arrangement according to Fig. 2 may be used as a D. C.-A. C. converter as it appears from Fig. 3 which shows the current path during commutation. The two windings are connected in parallel at this moment and the instantaneous voltages are equal and opposed. The voltage impressed from the D. C. side acts as driving voltage and counteracts the secondary voltage of the transformer. If now the said driving direct voltage is greater than the rectified mean value of the secondary voltages, the direction of the energy flow will be reverted, i. e. the direction of the current is changed and the direct current is converted into a tri-phase current.

Contrary to the known mercury vapour D. C.-A. C. converter no reversal of polarity is necessary in the contacting converter, for the direction of the energy flow results from the direct voltage differences between the A. C. and the D. C. side. The contacting converter has no so-called valve effect since it comprises metal contacts. The change from rectifier to D. C.-A. C. operation can be effected in one and the same arrangement without shock and any loss of time.

Fig. 4 shows an embodiment of the switching device for carrying out the method of the present invention.

The switching device shown is in principle similar to that shown in Fig. 2 and comprises a main transformer T1 and the two contacting apparatus TK1 and TK2. The latter may be of any known type. They may for instance comprise a plurality of stationary contact segments over which a wiping contact is moved synchronously to the mains frequency. Preferably contacting apparatus will be provided using pressure contacts which have practically no wear. The movable contact member may comprise a tumbler body, the contact surface of which is rolled upon the stationary contact surface, or separate contacting devices controlled by a cam shaft in a similar manner as valves of internal combustion engines may be provided.

For a satisfactory operation of the device it is necessary that on the one hand the movable contact members of the two contacting apparatus are driven in synchronism with the frequency of the mains current, and on the other hand that they become effective at the proper moment. For this purpose control devices are provided, besides of the synchronous motor SM used for the drive of the movable contact members, comprise a generator G, a shifting motor VM, relays R1, R2 and R3, limiting chokes D, rectifier elements GR and the auxiliary switches C1, C2 and C3. The shifting motor VM serves for the adjustment of the commutation moment.

The control arrangement is fed via an auxiliary switch S2 and an auxiliary transformer T2.

The switching device shown in Fig. 2 operates as follows:

In order to put the contacting converter into operation the auxiliary switch S2 leading to the auxiliary transformer T2 is closed. The synchronous motor SM obtains a voltage and speeds up until normal speed is reached. The synchronisation is obtained in that that a direct current supplied by a small metal rectifier is fed to the energisation winding of the rotor, the said current being disconnected after a short period by a slow releasing relay. The small alternating current generator G mounted on the shaft of the motor SM supplies a current via the metal rectifier element to relay R1 which is energised, thereby closing its contact. At the same time relay R3 receives also some current but being critically adjusted it does not yet attract its armature.

The auxiliary switches C1 and C2 are still open. If the movable contact members are not properly adjusted with respect to their associated stationary contact segments of the contacting apparatus TK1 and TK2, then an internal secondary current will flow via the limiting chokes D each time a change takes place from one set of contacts to the next one. The said limiting chokes D are small in size as they are not arranged in the load current circuit. The voltage induced in the secondary windings of the said chokes is rectified in the metal rectifier GR and causes the complete energisation of relay R3. The latter now operates its contacts and closes the control circuit for the auxiliary switch C2 which operates the shifting motor VM. The auxiliary contact of the said auxiliary switch opens the control circuit of the auxiliary switches C1 and C3 thereby preventing the switching-in of the auxiliary switch C1 and the quick-operating switch SS.

The shifting motor VM rotates only until the proper relation between the movable contact members and the stationary contact segments is reached in which case the limiting chokes D become dead. Relay R3 drops and at the same time also the auxiliary switch C2 whereby the shifting motor VM is disconnected. The auxiliary contact of the auxiliary switch C2 closes the control circuit for the auxiliary switches C1 and C3, so that the arrangement becomes ready for operation by switching-in the main switch S1. Relay R2 acts as a slow operating relay for the auxiliary switch C2 and its contact remains open until the auxiliary contact of the auxiliary switch C2 is opened.

What is claimed is:

1. Apparatus for converting power between a tri-phase alternating circuit and a direct current circuit comprising a transformer, two separate synchronously driven contact devices, a movable contact member associated with each contact device, corresponding contact segments of each being interconnected and connected with the terminals of the secondary windings of the transformer in the order whereby the movable contact members are continually changing over from a pair of contact segments of one phase to a pair of contact segments of the following phase at the interval in which the two phase voltages are equal but opposed.

2. Apparatus for converting power between a poly-phase alternating circuit and a direct current circuit, comprising a transformer, two separate synchronously driven contact devices, a movable contact member associated with each contact device, corresponding contact segments of each being interconnected and connected with the terminals of the secondary windings of the transformer in the order whereby the movable contact members are continually changing over a pair of contact segments of one phase to a pair of contact segments of the following phase with an interval of parallel closing of the secondaries in circuit therewith and at which interval the voltage of the phase intermediate of the change-over is at zero.

3. An apparatus, as claimed in claim 2, having a driving motor for the contact devices and control circuit means associated therewith and operative to establish the desired spatial relation between the contact segments and their cooperating movable contact members and switching devices energized by the control circuit for closing the rectified circuit when the properly synchronized spatial relation is established.

4. An apparatus as claimed in claim 2, characterised by a shifting motor effective in dependency on a voltage difference between two contact segments and serving to establish the desired spatial relation between the contact segments and their cooperating movable contacts members.

5. Apparatus for converting power between a tri-phase alternating circuit and a direct current circuit comprising a transformer, two separate synchronously driven contact devices; a movable contact member associated with each contact device, corresponding contact segments of each being interconnected and connected with the terminals of the secondary windings of the transformer in the order whereby the movable contact members are continually changing over a pair of contact segments of one phase to a pair of contact segments of the following phase at the interval at which the two phase voltages are equal but opposed, a driving motor for the contact devices and controlling circuit means therefor operative to establish the desired spacial relation between the contact segments and other cooperating movable contact members, said controlling circuit means being arranged for actuation by the secondary circuits of choke coils having their primaries in series with the secondaries of the main current transformer when the main load circuit is disconnected and serving to produce a control voltage for the controlling circuit means in case of incorrect spacial relation between the cooperating converter contacts.

CARL ZELLWEGER.